(No Model.) 2 Sheets—Sheet 1.

F. O. BLAKE.
APPARATUS FOR SPRAYING POISON ON PLANTS.

No. 598,846. Patented Feb. 8, 1898.

Witnesses
Geo. E. Finch
Hubert Peck

Inventor
Frank O. Blake
By Chas. E. Allen
Attorney (No Model.) 2 Sheets—Sheet 2.
F. O. BLAKE.
APPARATUS FOR SPRAYING POISON ON PLANTS.
No. 598,846. Patented Feb. 8, 1898.
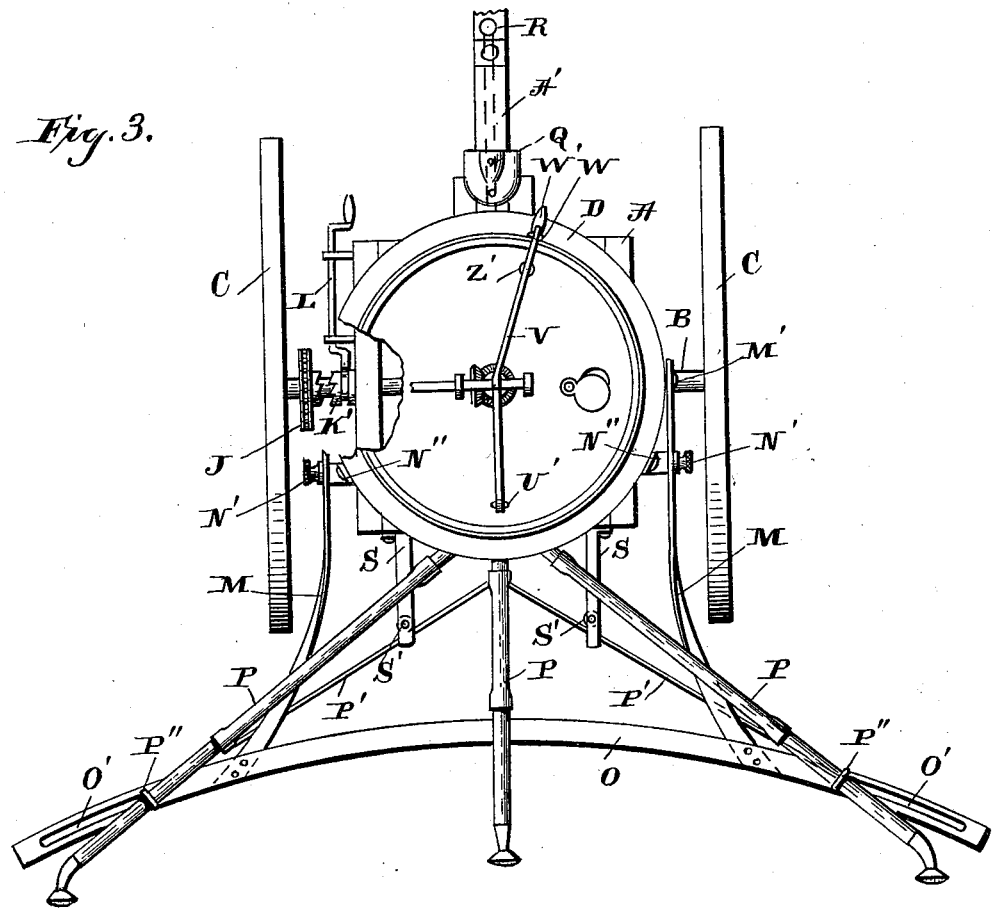
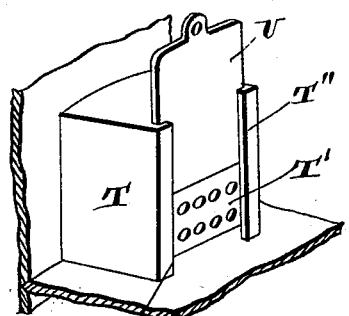
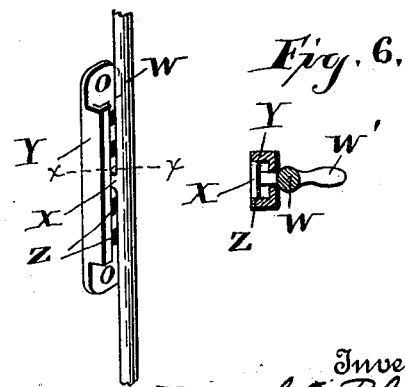
Witnesses
Geo. E. Frech,
Hubert C. Beck
Inventor
Frank O. Blake
By Chas. E. Allen,
Attorney

UNITED STATES PATENT OFFICE.

FRANK O. BLAKE, OF BURLINGTON, VERMONT.

APPARATUS FOR SPRAYING POISON ON PLANTS.

SPECIFICATION forming part of Letters Patent No. 598,846, dated February 8, 1898.

Application filed March 3, 1897. Serial No. 625,850. (No model.)

*To all whom it may concern:*

Be it known that I, FRANK O. BLAKE, a citizen of the United States, residing at Burlington, in the county of Chittenden and State of Vermont, have invented certain new and useful Improvements in Apparatus for Spraying Poison on Plants; and I do hereby declare the following to be a full, clear, and exact description of the invention, such as will enable others skilled in the art to which it appertains to make and use the same.

This invention relates to improved apparatus for spraying poison, particularly parisgreen, on plants for the purpose of destroying insects, the object being to provide an apparatus particularly adapted for spraying large fields of potatoes.

The invention consists in the novel features of construction and in the combination and arrangement of parts particularly described and claimed hereinafter and illustrated by the accompanying drawings, in which—

Figure 1:
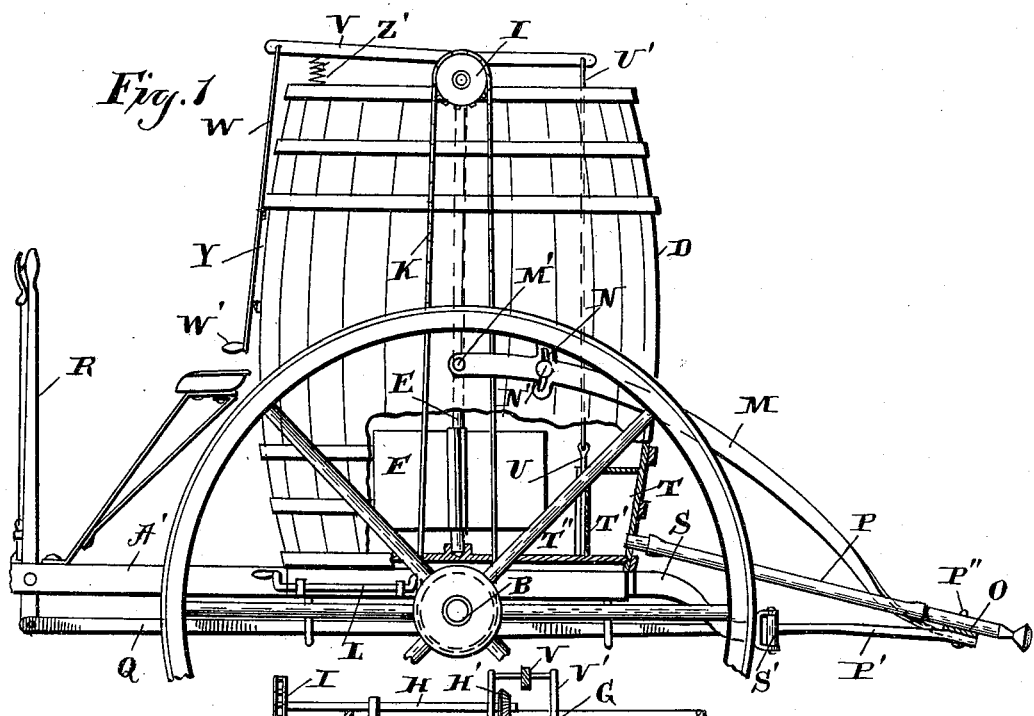
Figure 2:
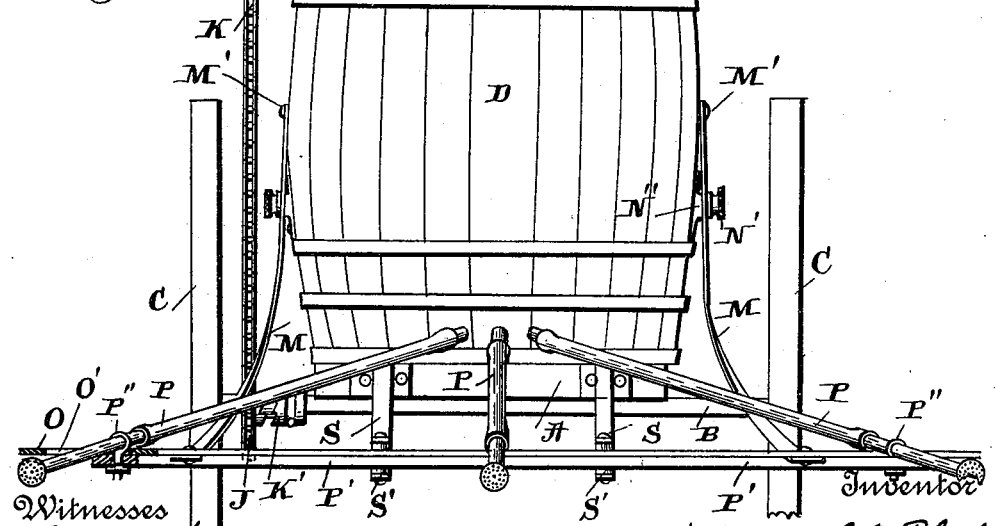

Figure 1 is a side elevation showing a portion of the reservoir broken away and also in section. Fig. 2 is a rear elevation. Fig. 3 is a plan view. Fig. 4 is a detail view of the valved discharge. Fig. 5 is a similar view of the lever and holding device for securing the discharge-valve in proper adjustment. Fig. 6 is a cross-section of Fig. 5 on line $x\ x$.

A designates a substantially square horizontal frame, and B the axle journaled on its under side. Supporting and drive wheels C are secured to and rotate the axle. Supported on frame A is a barrel-reservoir D, and suspended centrally therein is shaft E, having agitator F at its lower end and bevel-gear G at its upper end. Shaft H is journaled horizontally on the reservoir-top and at its inner end carries gear H', meshing with gear G, and at its outer projecting end sprocket I. Loose on shaft B is sprocket J, and chain K connects sprockets I and J, and by this means the agitator is revolved when the machine is in motion. Clutch-collar K on axle B, movable to and from sprocket J by lever L, serves to throw the agitator mechanism in and out of gear, as will be readily understood. Arms M are pivotally secured at M' to opposite sides of the reservoir and extend rearward and downward and are slotted at N, so as to be held in proper vertical adjustment by clamping-screws N', entering blocks N'' on the reservoir sides. A slightly-curved plate O is secured to the lower ends of these arms and is slotted adjacent its ends, as indicated at O'. The three flexible discharge-pipes P extend outward from the reservoir and over this plate and are provided with spraying-nozzles. The central pipe is secured to the plate O, while the two side pipes extend over slots O' and are adjustable inward and outward from the central pipe by spring-metal arms P', extending beneath the plate and secured to said pipes by loops P', passing through slots O'. Arms P' converge toward frame A and are secured to the rear end of bar Q, longitudinally slidable beneath frame A and at its forward end connected to adjusting-lever R, suitably mounted on pole A'. Brackets S extend rearward from frame A and support vertical rollers S', against which arms P' bear, causing them to positively adjust the movable discharge-pipes either inward or outward as bar Q is moved longitudinally by the operating-lever.

The apparatus is designed to sprinkle three rows of potatoes simultaneously, straddling the middle row operated upon by the central fixed pipe P, while by means of the mechanism just described the side pipes are adjusted so as to come directly over the outside rows.

Trap T is arranged within the reservoir, and pipes P discharge therefrom. The front side of the trap consists of a perforated plate T', and on each side thereof are vertical guides T'', in which moves the cut-off slide or valve U, secured to the lower end of rod U', extending upward through the reservoir. Lever V is arranged centrally on the top of the latter and is fulcrumed to bracket V', rod U' being connected to the rear end of the lever. Depending from the forward end thereof is rod W, having handle W' at its lower end and on its rear side provided with hooked projection X, adapted to move in guide Y, arranged vertically on the front of the reservoir, with a succession of openings Z in its rear face, in any one of which hooked projection X is adapted to take to hold lever V in position for sustaining valve U in proper adjustment for discharging a large or small quantity of poison, as desired. Spring Z', beneath the forward end of lever V, holds the same normally raised and the valve closed by rod W. Thus the amount of poison discharged may be conveniently and accurately regulated.

The usefulness of the apparatus is not limited, as the spraying-pipes may be adjusted to operate on rows varying in width, and spraying, as it does, three rows at a time, the work may be very rapidly done. The agitator mechanism is most effectual in maintaining the paris-green in solution.

Having thus fully described my invention, what I claim as new, and desire to secure by Letters Patent, is—

1. A spraying apparatus comprising a reservoir, discharge-pipes leading therefrom, and a vertically-adjustable support for their outer ends, substantially as shown and described.

2. A spraying apparatus comprising a reservoir, discharge-pipes, a centrally-arranged longitudinally-moving adjusting device, and spring-arms connecting said device with the outer portions of the pipes, substantially as shown and described.

3. A spraying apparatus comprising a reservoir, discharge-pipes, an adjusting device, spring-arms connecting the device and the pipes, and the guide-rollers arranged adjacent the arms, substantially as shown and described.

4. A spraying apparatus comprising a reservoir, discharge-pipes leading therefrom, the transversely-arranged and slotted plate supporting the outer ends of the pipes, an adjusting device, and the spring-arms diverging therefrom and extending beneath the plate and secured by connections passing through the slots to the pipes, substantially as shown and described.

5. A spraying apparatus comprising a reservoir, discharge-pipes leading therefrom, a rearwardly-extended support for sustaining the outer ends of the pipes, the longitudinally-movable adjusting-bar extended beneath the reservoir, the spring-arms diverging therefrom and connected to the outer portions of the discharge-pipes, and the rollers suitably supported in vertical position and arranged adjacent the spring-arms, substantially as shown and described.

6. The combination with the reservoir and the discharge-pipes leading therefrom, of a trap within the reservoir and inclosing the entrance to said pipes, one face of the trap being perforated, and a valve adjustable thereover, substantially as shown and described.

7. The combination of the reservoir and the valved discharge, of the lever fulcrumed over the reservoir and at one end secured or connected to the discharge-valve, a rod depending from the opposite end of the lever, a lateral projection on the rod, and a graduated holding device adapted to be engaged by the projection, substantially as shown and described.

8. The combination with the reservoir and the valved discharge, of the lever fulcrumed over the reservoir and at its rear end connected to the discharge-valve, a spring for holding said end normally depressed with the valve closed, and means for adjustably holding the opposite end of the lever depressed with the valve open, substantially as shown and described.

9. The combination with the reservoir and the valved discharge, of the lever fulcrumed over the reservoir and at its rear end connected to the discharge-valve, the rod depending from the forward end of the lever, the hooked projection on the inner side of the rod, the vertical guide secured to the reservoir in which the projection moves, the guide being formed with a succession of openings adapted to be engaged by the hooked projection for holding the valve in the desired adjustment, substantially as shown and described.

10. The combination of a reservoir, discharge-pipes movable toward and away from each other, and an adjusting means movable at right angles to the direction of movement of the pipes and operatively connected thereto, substantially as shown and described.

In testimony whereof I do affix my signature in presence of two witnesses.

FRANK O. BLAKE.

Witnesses:
GILBERT A. DOW,
EDWARD S. ISHAM.